US008634829B2

(12) United States Patent
Palviainen

(10) Patent No.: US 8,634,829 B2
(45) Date of Patent: Jan. 21, 2014

(54) SYSTEM AND METHOD FOR IMSI LIST BASED VLR RESILIENCE

(75) Inventor: Keijo L. Palviainen, Hyvinkää (FI)

(73) Assignee: Nokia Corporation (FI)

( * ) Notice: Subject to any disclaimer, the term of this patent is extended or adjusted under 35 U.S.C. 154(b) by 1873 days.

(21) Appl. No.: 11/479,292

(22) Filed: Jun. 30, 2006

(65) Prior Publication Data

US 2008/0004014 A1    Jan. 3, 2008

(51) Int. Cl.
| H04W 4/00 | (2009.01) |
| H04W 36/00 | (2009.01) |
| H04M 1/00 | (2006.01) |
| G06F 11/16 | (2006.01) |
| G06F 11/00 | (2006.01) |

(52) U.S. Cl.
USPC ........ 455/433; 455/435.1; 455/436; 455/560; 370/331; 714/4.11; 714/2

(58) Field of Classification Search
USPC .......................... 455/8, 418–420, 432.1–433, 455/435.1–445, 560; 714/4, 100, 2; 370/331
See application file for complete search history.

(56) References Cited

U.S. PATENT DOCUMENTS

| 5,623,532 | A | * | 4/1997 | Houde et al. ................. 455/445 |
| 5,953,662 | A | * | 9/1999 | Lindquist et al. ............. 455/433 |
| 6,058,308 | A | * | 5/2000 | Kallin et al. ............... 455/432.3 |
| 6,408,182 | B1 | * | 6/2002 | Davidson et al. ............. 455/433 |
| 6,731,932 | B1 | | 5/2004 | Rune et al. |
| 7,082,308 | B1 | | 7/2006 | Kaura et al. |
| 7,483,411 | B2 | * | 1/2009 | Weinstein et al. ............. 370/338 |
| 2002/0087588 | A1 | * | 7/2002 | McBride et al. .............. 707/204 |
| 2002/0128008 | A1 | * | 9/2002 | Phan-Anh et al. ............ 455/424 |
| 2002/0193103 | A1 | * | 12/2002 | Daly ........................... 455/419 |
| 2005/0261005 | A1 | * | 11/2005 | Hu ............................. 455/456.5 |
| 2006/0036761 | A1 | * | 2/2006 | Amra et al. ................... 709/238 |
| 2007/0281686 | A1 | | 12/2007 | Liu et al. |

FOREIGN PATENT DOCUMENTS

| WO | WO 96/21981 | 7/1996 |
| WO | WO 2005/086514 | 9/2005 |

OTHER PUBLICATIONS

International Search report for PCT Application No. PCT/IB2007/052359.

* cited by examiner

*Primary Examiner* — Vladimir Magloire
*Assistant Examiner* — Michael Mapa
(74) *Attorney, Agent, or Firm* — Banner & Witcoff, Ltd.

(57) ABSTRACT

A system and method for moving wireless subscribers previously registered with a failed source MSC/VLR or SGSN to a new target MSC/VLR or SGSN in GSM and UMTS networks, using super-charger technology. The present invention allows mobile subscriber IMSIs to be transmitted to a new target MSC/VLR or SGSN before a source MSC/VLR or SGSN fails. Upon failure of the source MSC/VLR or SGSN, the addresses of the source MSC/VLR or SGSN serving the transmitted IMSIs are updated in an HLR and are associated with the addresses of the new target MSC/VLR or SGSN using MAP location update procedures. In another embodiment of the present invention, the addresses of the source MSC/VLR or SGSN servicing mobile subscribers are updated in an HLR to the addresses of the new target MSC/VLR or SGSN without the need for mobile subscribe IMSIs.

25 Claims, 10 Drawing Sheets

SYSTEM AND METHOD FOR IMSI LIST BASED VLR RESILIENCE

FIELD OF THE INVENTION

The present invention relates generally to the field of moving wireless subscribers. More specifically, the present invention relates to moving wireless subscribers served by a failed network element to a new or replacement network element.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

One feature of mobile telecommunications systems is the ability to allow a mobile subscriber to travel from one location area (LA) to another LA, and even possibly from one network to another network (commonly known as roaming) while still retaining service. In order to implement such functionality, mobile telecommunications systems typically employ various registers that a mobile subscriber is associated with. For example, a home location register (HLR) can maintain a mobile subscriber's location information and is a register where a mobile subscriber is permanently registered. On the other hand, a visitor location register (VLR) is a register where a mobile subscriber is only temporarily registered.

In traditional circuit switched mobile telecommunications systems such as a Global System for Mobile Communications (GSM) network, each VLR is typically associated with a mobile switching center (MSC), and it is this MSC that actually provides service to the mobile subscriber. If the mobile subscriber travels outside a certain LA or into another network, that mobile subscriber will be temporarily registered with a new VLR and served by a new MSC. In most systems, the HLR will know with which VLR a mobile subscriber is registered. In turn, that VLR knows within which LA the mobile subscriber is presently located. This location information is important because it allows the system to find any mobile subscriber to which a call or communication must be routed. For example, if an incoming call is to be terminated at a mobile station, the system must know which LA the mobile subscriber is currently in so that the call signaling and actual call data may be routed to the correct LA. In Universal Mobile Telecommunications System (UMTS) networks, where both circuit switched service and general packet radio service (GPRS) are supported, serving GPRS support nodes (SGSNs) are the equivalent of MSCs while routing areas (RAs) are the equivalent of LAs. Any given RA then is registered in an associated SGSN for packet switched communications. The MSC/VLR and SGSN make up part of the core network for mobile telecommunications systems.

The capacity of elements used in GSM and UMTS networks are growing. A single MSC/SGSN and its associated VLR may today serve 1 million subscribers. In the near future, multiple millions of subscribers may be served by a single MSC/VLR or SGSN. As discussed above, a VLR is integral to determining where a mobile subscriber is located. If such an element were to fail, the impact on service and revenue would be significant. Moreover, the reputation of a service operator as well as a vendor may be lost for good if a failure were to occur.

If a VLR is reset, all of its temporary data, including the temporary mobile subscriber registrations, is lost. In today's networks, this is not a problem because a GSM core network, for example, is able to use standard MAP procedures. However, if a VLR does not restart properly, e.g. due to some hardware damage resulting from a natural disaster, a back-up system/element must be employed. Such a back-up may simply comprise a redundant MSC/VLR or SGSN, or it may comprise some other MSC/VLR or SGSN that can accommodate the mobile subscribers in a load sharing mode. In the latter case, each mobile subscriber is relocated to another MSC/VLR or SGSN. Unfortunately, if this is done, the HLR associated with the failed MSC/VLR or HLR will not know about the relocation and thus all incoming traffic will fail until the new (target) VLR updates the mobile subscribers' locations to the HLR. To make matters worse, the target VLR does not report to the HLR until either a mobile subscriber initiates a location update (LU), e.g. due to change of location area, or due to periodic location update. Because the periodic LU timer may be set for a period of hours, the break in service would be unacceptable.

In the event of a failure of an HLR "N+X load sharing," in which an entire HLR database is backed up in a server and downloaded to a redundant HLR if needed, can be used. However, keeping an up-to-date copy of an entire VLR database is very resource consuming and would require a great deal of signaling between VLRs. As such, the only current potential solution for rectifying a failed MSC/SGSN/VLR scenario is to re-home elements such as base site controllers (BSCs), radio network controllers (RNCs), public switched telephone network (PSTN) trunks, and signaling links to a new MSC or SGSN.

It is therefore desirable to provide a system and method whereby MSC/SGSN/VLR resiliency can be achieved without having to copy entire VLR databases, as well as having the option to utilize super-charge technology to accomplish such resiliency.

SUMMARY OF THE INVENTION

The present invention comprises a system and method for moving mobile subscribers and their traffic from a failed network element such as an MSC/VLR or SGSN to a new network element so as to minimize any service disruption. Prior to a network element failure, a source MSC/VLR or SGSN produces a list of mobile subscribers registered thereon. The generation of the list can be either periodical or triggered by some event, while the list itself could be a complete list of mobile subscribers or just an update of deleted and new mobile subscribers. The list is then transferred or downloaded to a resilience server, which may be a dedicated server or merely another MSC/VLR or SGSN. If the source MSC/VLR or SGSN fails, a target VLR is instructed to upload the list either automatically or following an operator command. Once the target VLR receives the list, those mobile subscribers in that received list are tagged with a special status, indicating that the HLR is unaware that they have been registered to a new VLR. Once the HLR has been updated of their status, they are indicated as no longer needing an HLR update.

The present invention allows for the HLR to change MSC, SGSN, and VLR addresses for mobile subscribes having a certain source VLR. Such a solution works when one VLR is to completely replace another VLR. Virtual VLR and MSC addresses can be used based on location area codes (LACs). With the present invention, VLR resiliency can be realized without having to keep complete VLR database copies. Moreover, standard MAP messaging can be used, and the shock impact of a failed MSC or SGSN is minimized with the present invention. Additionally, if super-charger technology is used, network elements such as BSCs and RNCs can be re-homed based on LACs using the present invention.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
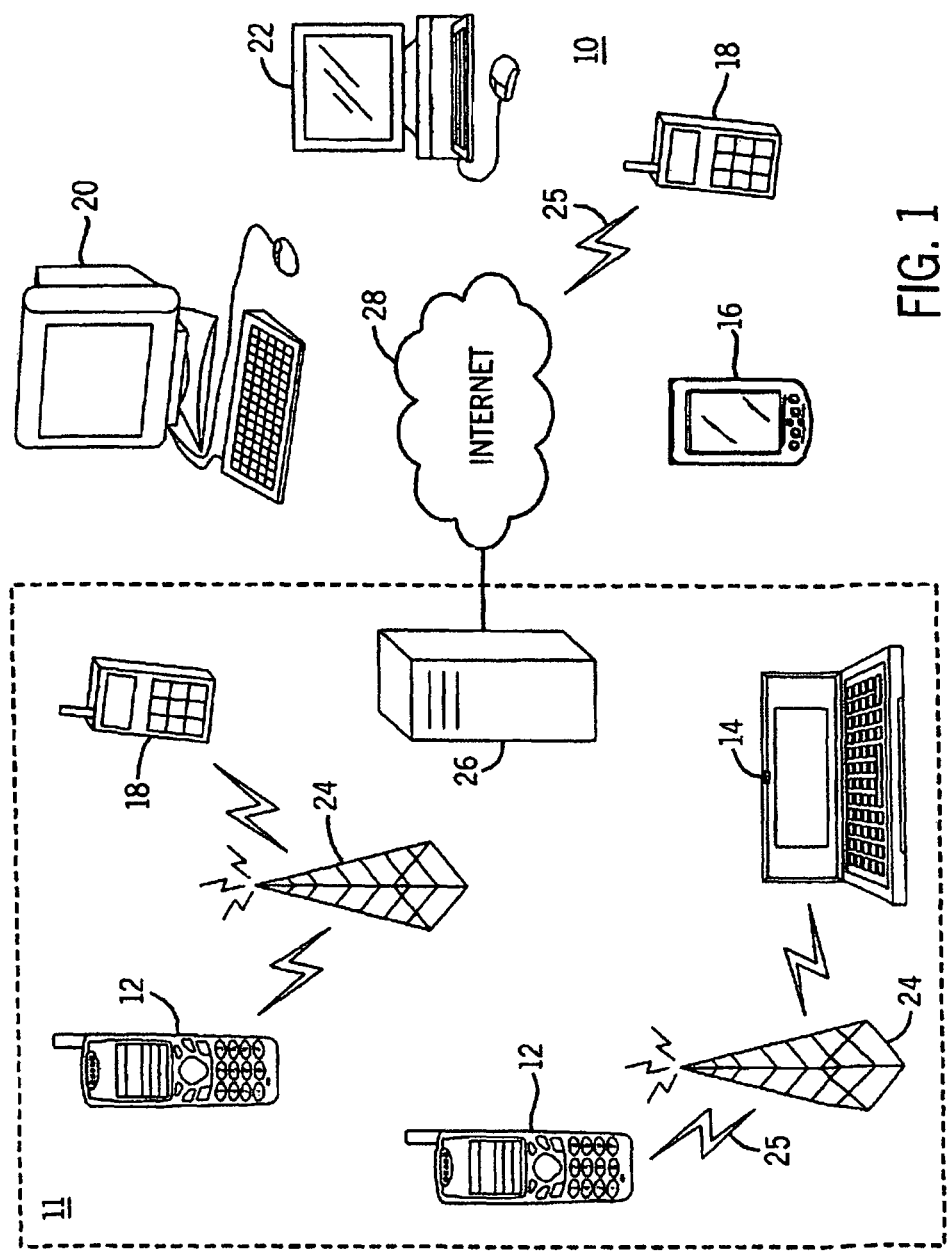
FIG. 1 is an overview diagram of a system within which various embodiments of the present invention may be implemented.

FIG. 1 shows a system 10 in which various embodiments of the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile subscriber (MS) 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc., hereinafter also referred to as MSs. Some or all of the communication devices may send and receive calls and messages and communicate with service providers through a wireless connection 25 to a base station site 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), GSM, UMTS, Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
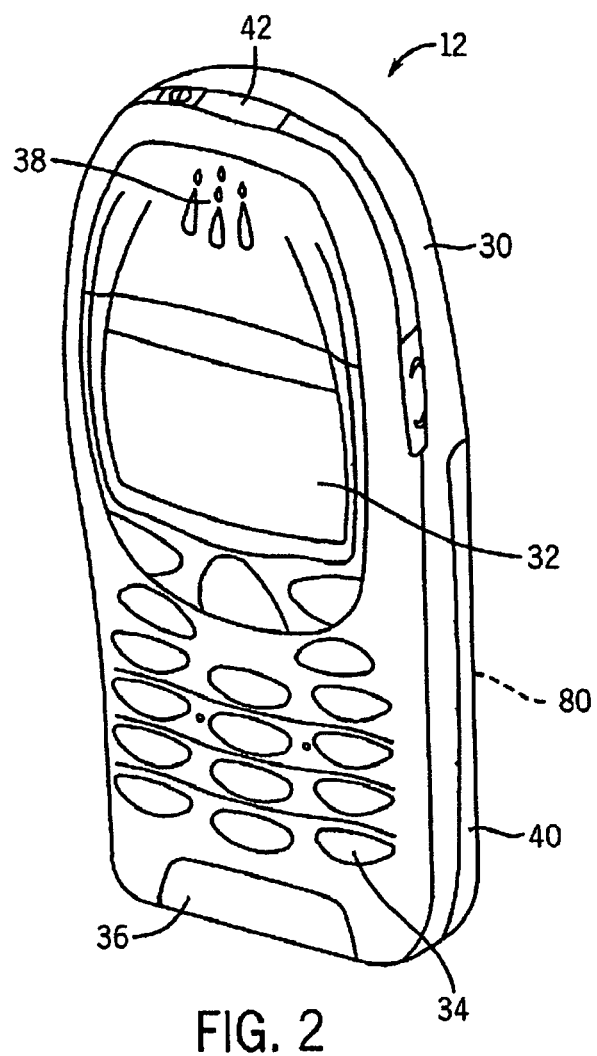
FIG. 2 is a perspective view of an electronic device that can be used in the implementation of various embodiments of the present invention.
Figure 3:
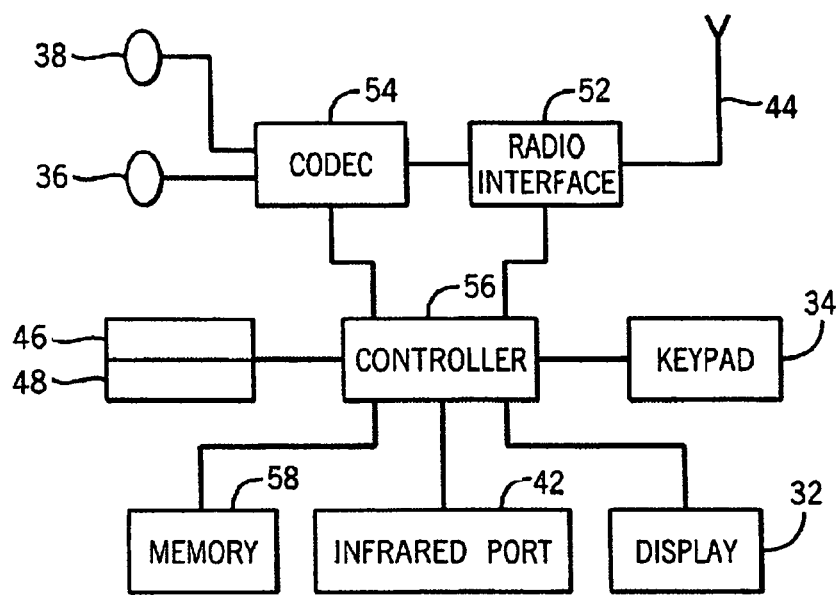
FIG. 3 is a schematic representation of the telephone circuitry of the electronic device of FIG. 2.

FIGS. 2 and 3 show one representative mobile telephone 12 that may be used in various embodiments of the present invention. It should be understood, however, that the present invention is not intended to be limited to work with one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Figure 4:
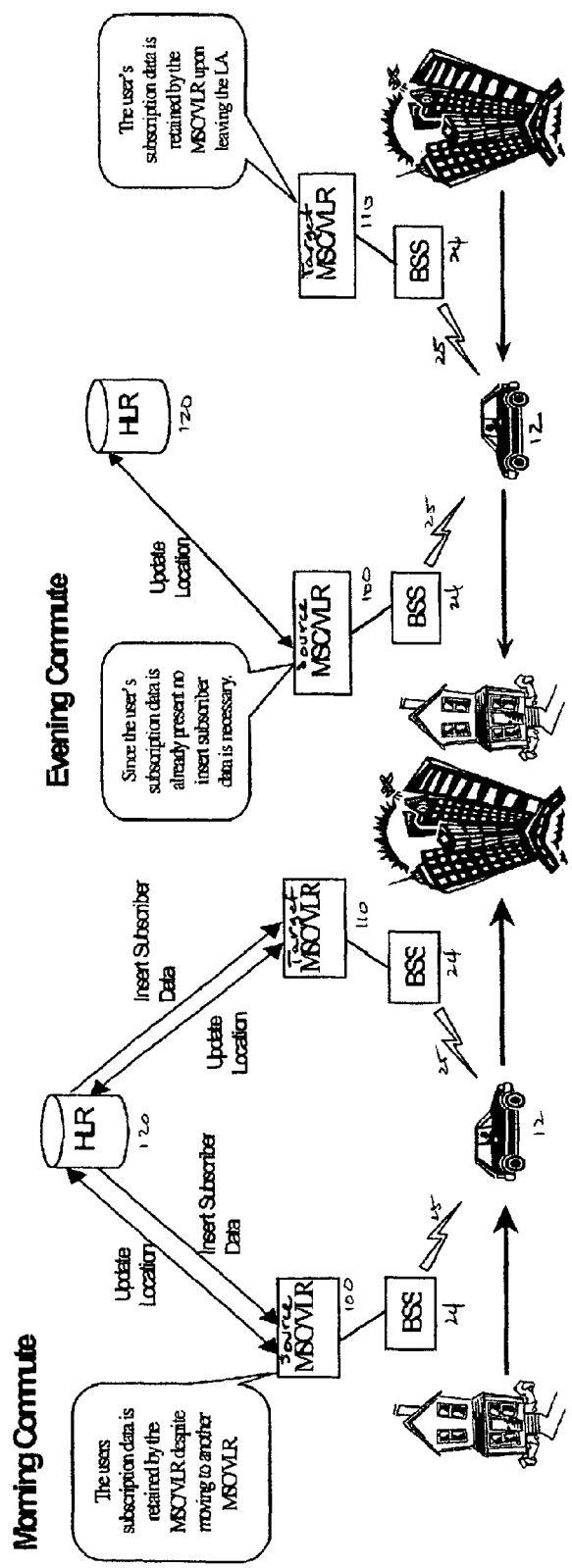
FIG. 4 is a diagram showing the operation of standard super-charger technology.

Referring to FIG. 4, a technology referred to as super-charging, used in solving an MSC/SGSN/VLR resiliency problem, is shown. Super-charging technology can be implemented according to $3^{rd}$ Generation Partnership Project (3GPP) TS 23.116, and is currently used to reduce HLR and VLR loads during location changes of an MS. When an MS 12 moves from a source VLR 100 to a target VLR 110, the MS subscriber data is not deleted from the VLR 100. If the MS 12 returns to a local area covered by the source VLR 100, its data is already present and can be re-used. The same holds true when the MS 12 leaves the target VLR 110 and returns to the source VLR 100. In addition, the HLR 120 can send an Age Indicator (AI) associated with the MS 12 to the target VLR 110, and if the MS 12 already exists in that target VLR, 110, based on its AI, the HLR 120 can decide whether or not the MS data must be updated in the target VLR 110. It should be noted that the above and any following processes and features can be implemented in a network supporting GPRS, wherein an SGSN is the functional equivalent of VLRs 100 and 110 in a packet radio network.

Figure 5:
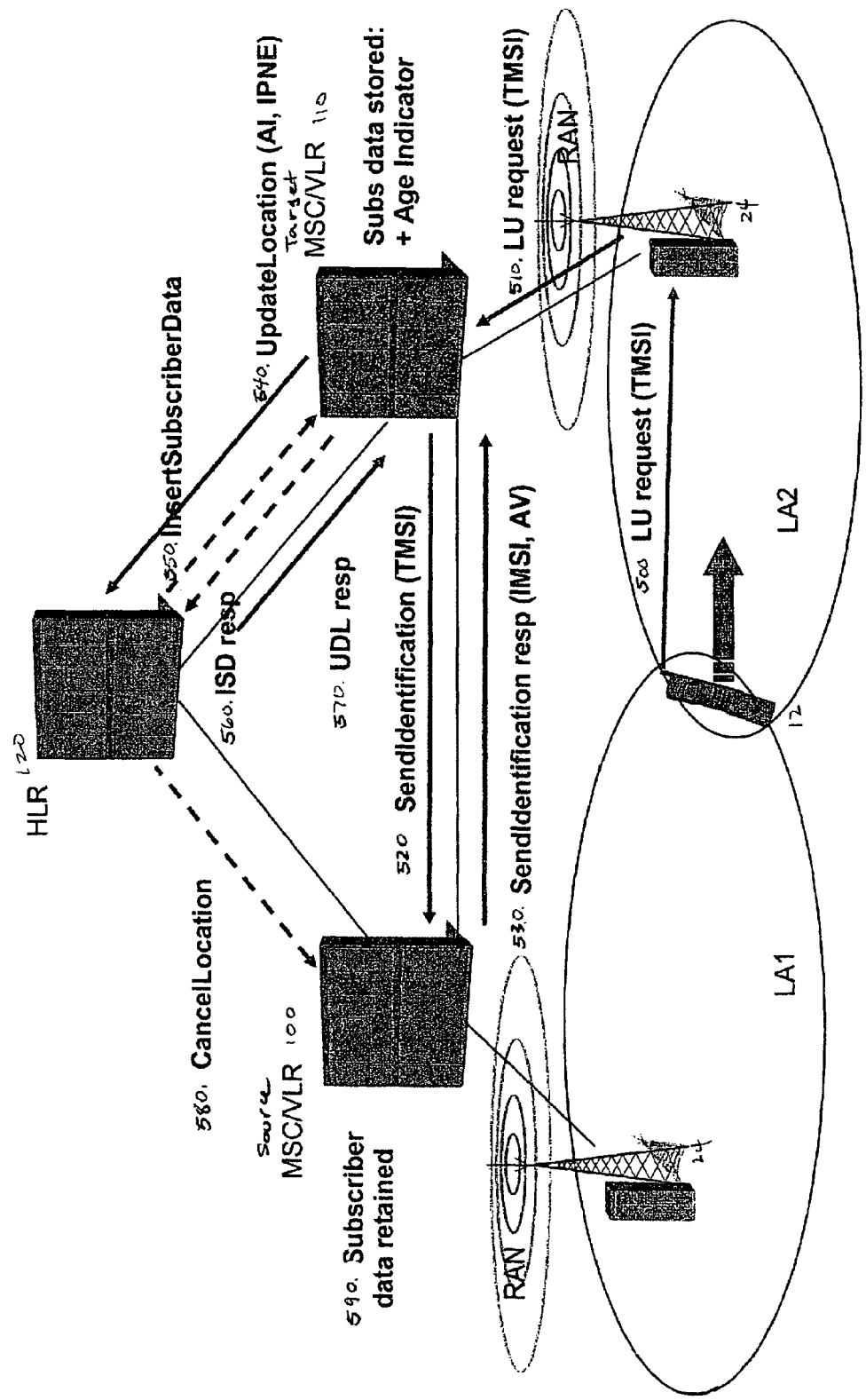
FIG. 5 is a diagram showing the messaging and network functionality during operation of standard super-charging technology.

FIG. 5 shows the messaging and network functionality of standard super-charging using standard MAP messaging, as an MS 12 moves from a first location area LA1 to a second location area LA2. At 500, a Location Update (LU) request message based on the Temporary Mobile Subscriber Identity (TMSI) of the MS 12 is sent from the MS 12 to a target base station site (BSS) 24. The BSS 24 then forwards the LU request message to the target MSC/VLR 110 at 510. A TMSI is a randomly allocated number that is given to an MS upon registration. It is the identity that is most commonly sent between an MS and a network and is local to a single LA, and so it must be updated each time an MS moves to a different LA. When the target MSC/VLR 110 receives the LU request, it sends a Send Identification message requesting the identity of the MS 12 associated with the received TMSI to the source MSC/VLR 100 at 520. The source MSC/VLR 100 retrieves the appropriate International Mobile Subscriber Identity (IMSI), as well as an authentication vector (AV) for that IMSI record, and responds to the target MSC/VLR with a Send Identification response at 530. An IMSI is a unique number that is given to all GSM and UMTS MSs, and is used to identity the MS to the network so that other details, preferences, etc. of an MS may be retrieved from an HLR or, as locally copied, from a VLR. It should be noted that an MS telephone number or any other similar identifier could be used instead of IMSI data. The target MSC/VLR 110 stores the MS 12 subscriber data along with an AI. At 540, the target MSC/VLR 110 sends a message to the HLR 120 indicating an update of location (UDL) to change the MSC/VLR address serving the MS 12 from the source MSC/VLR 100 to the target MSC/VLR 110, and instructions for the HLR 120 to inform the previous entity (IPNE) of the LU. At this point, the MS 12 subscriber data is sent from the HLR 120 to the target MSC/VLR 110 at 550 as an ISD request. The target MSC/VLR 110 then responds at 560 with an ISD response, after which the HLR 120 responds at 570 with a UDL response. At 580, the HLR 120 sends a cancel location message to the source MSC/VLR 100 so that the source MSC/VLR can release any connections for the MS 12.

Alternatively, because as discussed above, the HLR 120 can store AIs, there is no need for the ISD procedures, as shown by steps 550, 560, and 570, to be performed. The HLR 120 stores AIs and updates them per subscriber when the subscriber data changes; per VLR address when supported services regarding a VLR change; per Public Local Mobile Network (PLMN) when services previously not allowed are changed; and per HLR when any HLR parameters change. In addition, the cancel location request sent at 580 that normally would be transmitted by the HLR 120 to the source MSC/VLR 100 as a result of the IPNE request by the target MSC/VLR 110 need not be sent. This is possible because when the network is super-charged, the MS 12 subscriber data is retained by the source MSC/VLR 100, and the missing IPNE parameter indicates to the HLR 120 not to perform a cancel location action at the failed source MSC/VLR 100.

Figure 6:
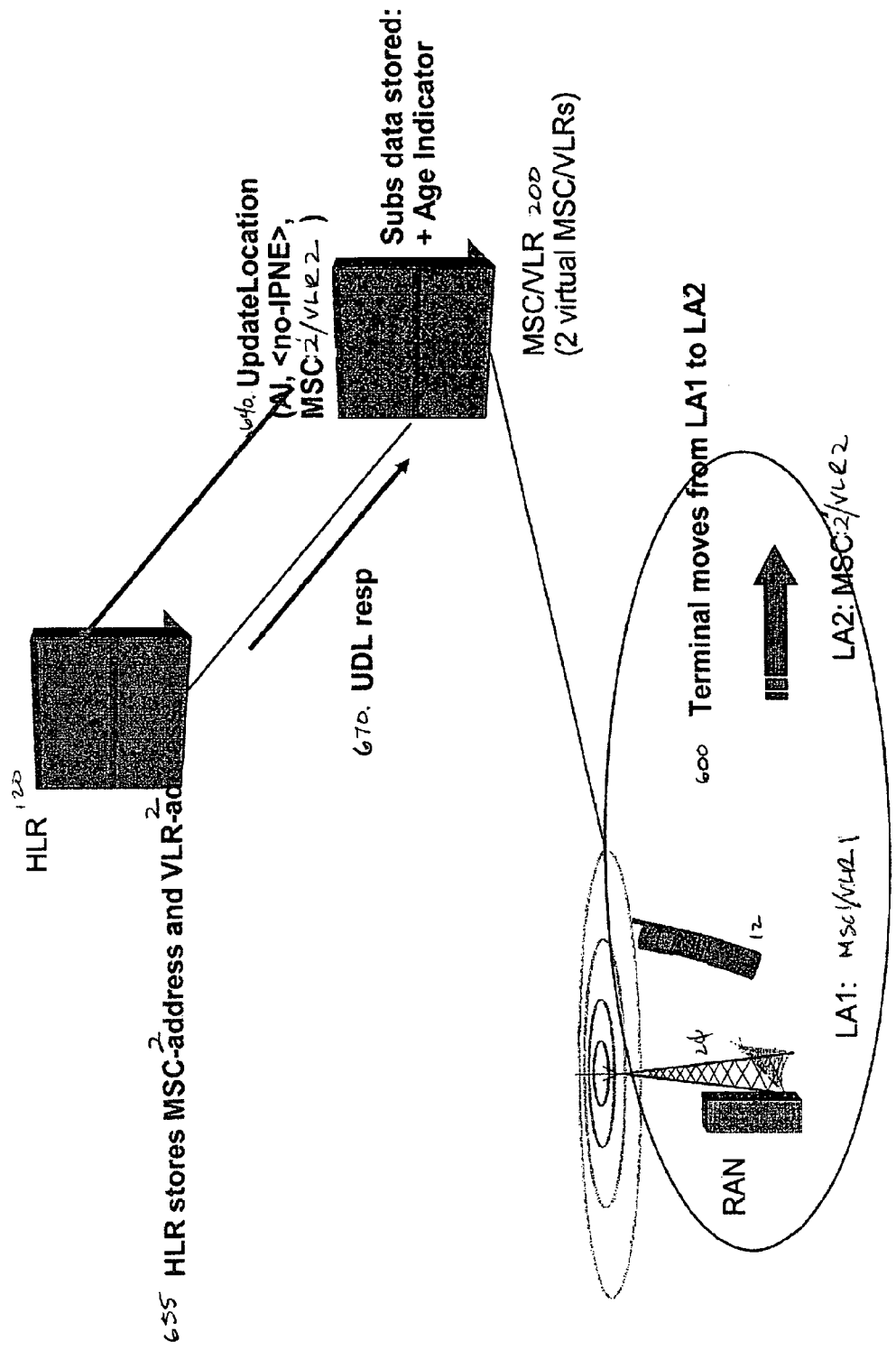
FIG. 6 is a diagram showing the messaging and network functionality during operation of standard super-charging technology of an intra-VLR location update.

In another variation on super-charging technology, FIG. 6 shows an intra-VLR location update before any MSC/VLR failure occurs. An MSC/VLR 200, comprising two virtual MSC/VLRs is shown, where virtual MSC/VLR 1 services LA 1 and virtual MSC/VLR 2 services LA 2. When the MS 12 moves from LA 1 to LA 2 at 600, the MS subscriber data and an AI is stored in MSC/VLR 200. At 640, the MSC/VLR 200 sends a message to the HLR 120 indicating an update of location (UDL) to change the MSC/VLR address serving the MS 12 from the virtual MSC/VLR 1 to the virtual MSC/VLR 2 and an AI. However, unlike the previous embodiment discussed above, no IPNE instruction is sent because the MSC/VLR 200 is already operating as the virtual MSC/VLR 1 and the virtual MSC/VLR 2, and no previous network entity needs to be informed of any change. The HLR 120 stores the virtual MSC/VLR 2 address at 655, and at 670, the HLR 120 sends a UDL response to the MSC/VLR 200.

Figure 7:
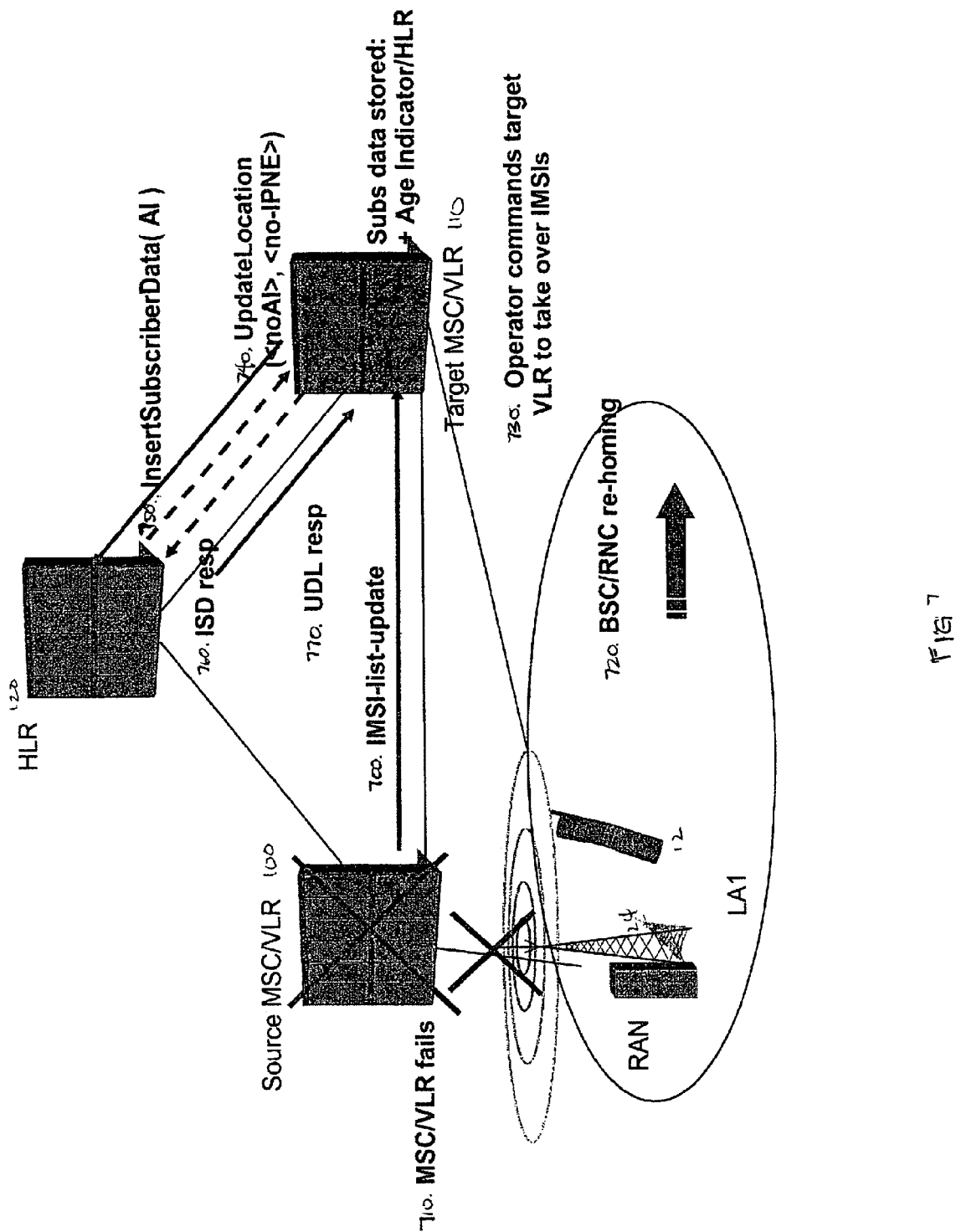
FIG. 7 is a diagram showing the messaging and network functionality of enhanced super-charger technology as applied in various embodiments of the present invention when a first user is moved to a new MSC/VLR.

FIG. 7 shows how super-charging technology can be used to effect IMSI-based VLR resiliency in one embodiment of the present invention. At 700, a source MSC/VLR 100 is programmed to periodically produce a complete list of IMSIs currently stored therein, or on an as-needed basis, including that of MS 12. Alternatively, the source MSC/VLR 100 can produce an update of both deleted and new IMSIs. Optionally as well, a location area code (LAC) which defines a specific LA, can be stored with each IMSI. After the complete list or update of IMSIs is produced, a file containing that list or update is sent to a back-up server for storage. The back-up server may be a dedicated server or another VLR, such as the target MSC/VLR 110. In yet another embodiment, an MSC may update multiple MSC/VLRs using a multipoint A/Iu feature, where A is the A interface found between an MSC and a BSC in a GSM network and Iu is the Iu interface/reference point between an RNC and the core network in a UMTS network.

At 710, a scenario where the source MSC/VLR 100 fails is shown. In response to the failure of the MSC/VLR 100, a network operator, at 720, can simply re-home BSS 24, which includes at least one base site controller (BSC) and any associated radio network controller(s) (RNC(s)) of LA 1 to be serviced by the target MSC/VLR 110. Once re-homing is completed, the network operator instructs the target VLR 110 to read the IMSI list file from the dedicated server or other VLR and extract the IMSIs, hereinafter referred to as new IMSIs, from the complete or update list with its current IMSIs at 730. Alternatively, and because as discussed above, IMSIs can be associated with an LAC, the network operator can instruct the incorporation of new IMSIs to be performed on a LAC basis. This is useful, for example, when different LACs are distributed to various VLRs.

Once the new IMSIs are extracted, they are stored in the target VLR 110. The target VLR 110 then initiates a MAP-UpdateLocation request to the HLR 120 at 740. This is done to update the addresses of the MSC/VLR 100 in the HLR, so that MS information, for example, that of the MS 12 required in processing any communications to or from the MS 12 can be properly routed to the target MSC/VLR 110. The MAP-UpdateLocation request at 750 also includes an indication that the super-charging feature described above is supported, as well as a stored AI for each new IMSI, to which the HLR 120 responds at 760 with an ISD response. Alternatively, the AI of the first new IMSI sent to the HLR 120 does not have to be sent in the MAP-UpdateLocation request message from the target VLR 110. Therefore, the AI of the first new IMSI will only be updated in the target VLR 110 when the HLR 120 sends an UpdateLocation response message back to the target VLR 110 at 770. By sending a fresh AI, the target VLR 110 ensures that the HLR 120 does not update the subscriber data of MS 12 to associate it with the target MSC/VLR 110, for example, and this reduces the signaling load between the HLR 120 and the target MSC/VLR 110.

VLR resiliency is achieved because the super-charging feature allows the source MSC/VLR 100 to keep the old IMSIs of MSs that have moved out of the LA1 served by the source MSC/VLR 100. Therefore, when the complete or update IMSI list is produced by the source MSC/VLR 100, IMSIs of those MSs that have moved to another LA, such as the MS 12, are included and will continue to receive service from the target MSC/VLR 110 if any of those MSs return to the LA 1. In a non-super-charged network, the subscriber data of those MSs who moved to another LA before the source MSC/VLR 100 failed are lost and upon returning to LA 1, will not receive service.

Figure 8:
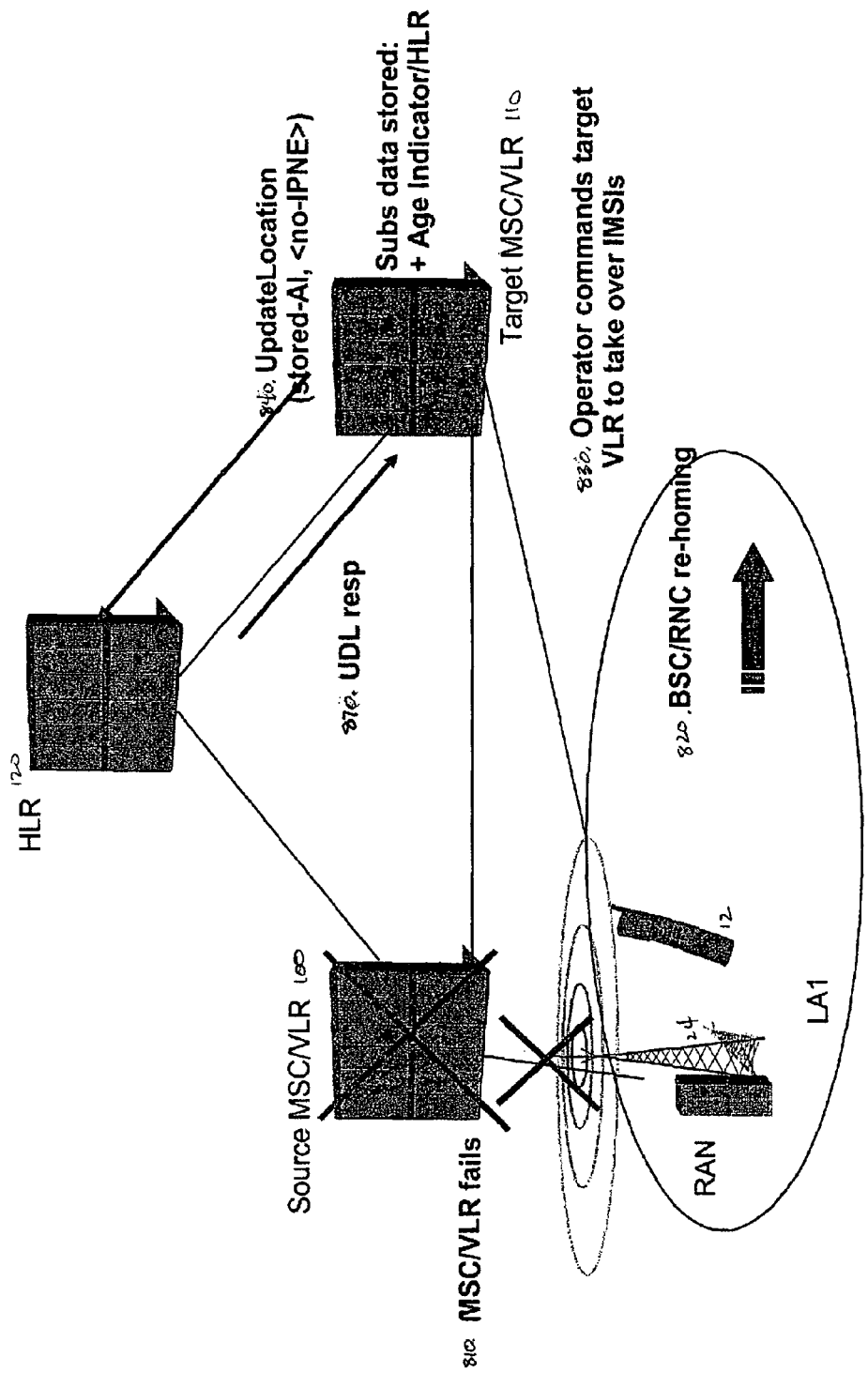
FIG. 8 is a diagram showing the messaging and network functionality of enhanced super-charger technology as applied in various embodiments of the present invention when a second user is moved to a new MSC/VLR.

FIG. 8 shows how the second and other subsequent IMSIs are treated, as described previously and as shown in FIG. 7. The source MSC/VLR 100 fails at 810. At this point, the IMSI list file has already been read by the target VLR 110, the network operator has commanded the target MSC/VLR 110 to update its IMSI list at 830, and the HLR 120 has already been updated as described above, by receiving an Update Location request at 840 and responding with a UDL response at 870. The second and other subsequent IMSIs may then be given the status of old, indicating that these subsequent MSs no longer need to be registered with the HLR 120.

Figure 9:
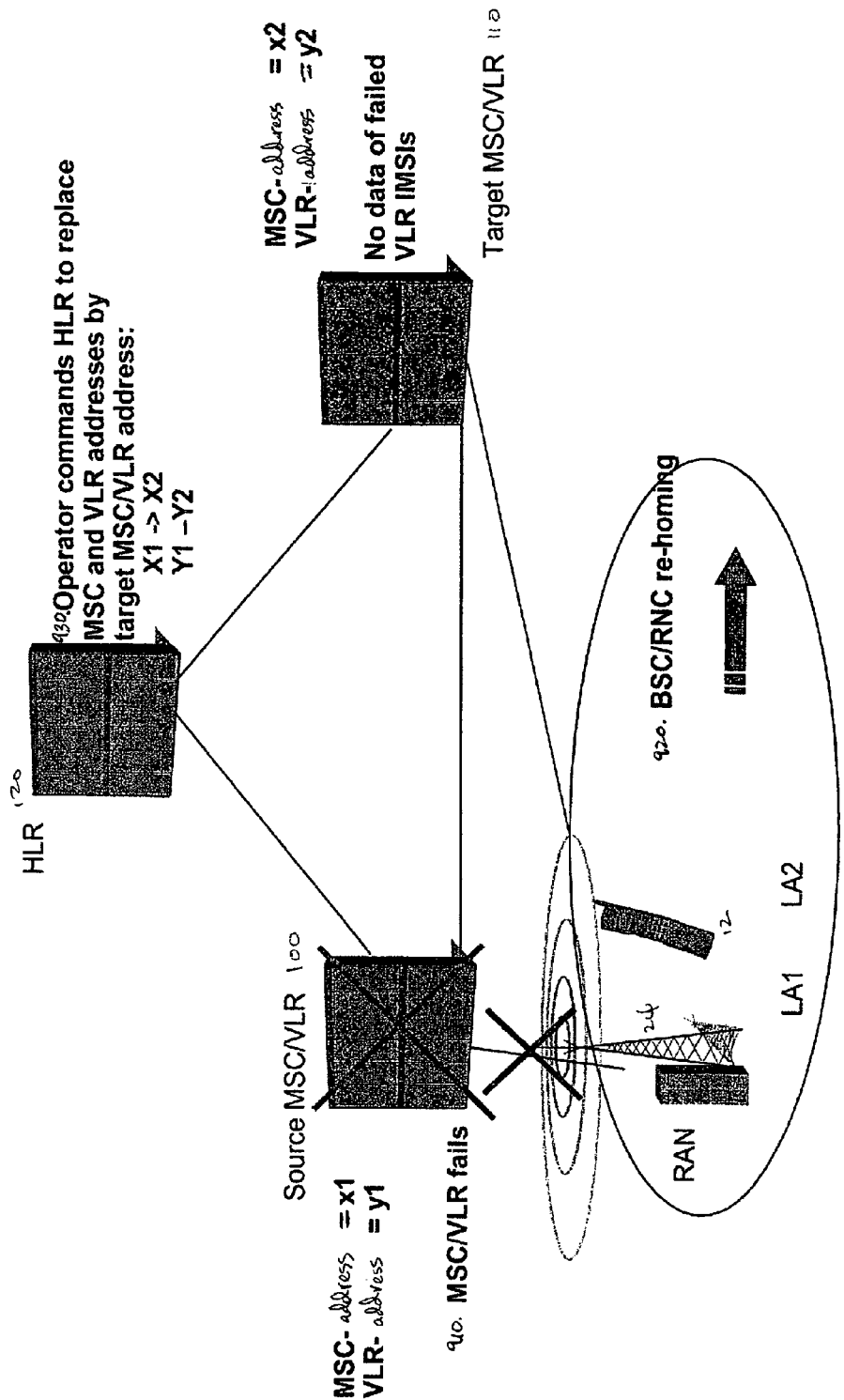
FIG. 9 is a diagram showing the messaging and network functionality of enhanced super-charger technology as applied in various embodiments of the present invention utilizing an HLR update.

In another embodiment of the present invention, VLR resiliency can be accomplished without the use of an IMSI list. FIG. 9 shows that the target MSC/VLR 110 has no IMSI data previously stored in the failed source MSC/VLR 100, such as that of the MS 12. As in the previous embodiment, once the source MSC/VLR 100 fails as in 910, a network operator can simply re-home BSS 24, which includes at least one BSC and any associated RNC(s) of LA 1 to be serviced by the target MSC/VLR 110, at 920. The network operator, at 930, can then command the HLR 120 to replace the addresses of the MSC/VLR(s) it has stored therein, such as the source MSC/VLR 110, with the addresses of the target MSC/VLR 110. The HLR 120 then replaces the source MSC 100 address X1 with the target MSC 110 address X2. The same is done for the source VLR 100 address Y1 and the target VLR address Y2. As in the previous embodiment, any MS previously being service by the source MSC/VLR 100 can then be serviced by the target MSC/VLR 110.

Figure 10:
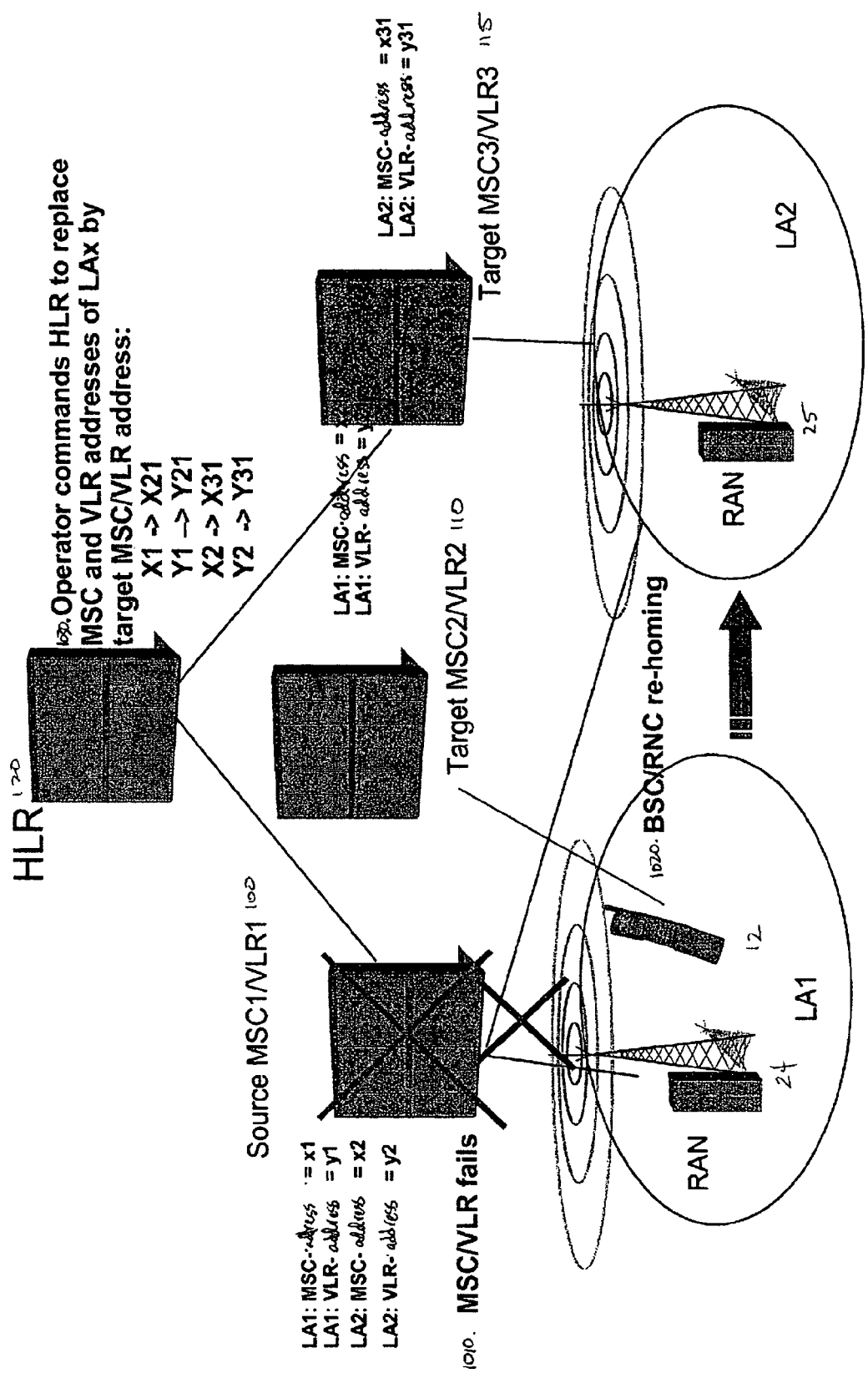
FIG. 10 is a diagram showing the messaging and network functionality of enhanced super-charger technology as applied in various embodiments of the present invention utilizing a per-LA HLR update during an MSC/VLR failure.

In FIG. 10, another embodiment, where VLR resiliency is handled on a LAC basis, is shown. In this embodiment, if the source MSC/VLR 100 fails as in 1010, instead of a network operator re-homing BSS 24, which includes at least one BSC and any associated RNC(s), to a first target MSC/VLR 110, the re-homing is performed on a per-LAC basis at 1020, which in this case, also includes re-homing to a second target MSC/VLR 115. At 1030, the network operator commands the HLR 120 to replace the addresses of the MSC/VLR 100 it has stored therein, with the addresses of the MSC/VLR 110, and the addresses of the MSC/VLR 110 are in turn replaced by the addresses of the MSC/VLR 115.

VLR resiliency in these last two embodiments of the present invention is achieved because, as with the previous embodiments discussed above, even if the MS 12 has moved from LA 1 to LA 2, the MS 12 subscriber data is maintained in the source MSC/VLR 100. Once the source MSC/VLR 100 fails, only the address of the source MSC/VLR 100 is changed in the HLR 120. Therefore, the association between the MS 12 and the source MSC/VLR 100 remains, except that the updated address of the source MSC/VLR 100 now points to the target MSC/VLR 110. The target MSC/VLR 110 can service the MS 12 even though the MS 12 is still associated with the source MSC/VLR 100.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention can be accomplished with standard programming techniques with rule based logic and other logic to accomplish the various database searching steps, correlation steps, comparison steps and decision steps. It should also be noted that the words "element" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
   receiving, by a computer, a first register mobile subscriber list;
   extracting a plurality of mobile subscriber identities from the first register mobile subscriber list, the plurality of mobile subscriber identities including one or more mobile subscriber identities corresponding to one or more mobile subscribers that were being serviced by a fourth register when a first register failed, the fourth register being different than the first register, a second register and a third register;
   tagging each of the one or more mobile subscriber identities with a first status; and
   based on the first status, determining to send a location update message to the third register to update an address of the first register stored in the third register to an address of the second register, allowing a first mobile subscriber corresponding to a first mobile subscriber identity of the plurality of mobile subscriber identities to be serviced by the second register.

2. The method of claim 1, wherein the first register mobile subscriber list is received periodically.

3. The method of claim 1, further comprising: creating, by the first register, the first register mobile subscriber list before the first register fails, wherein the creating is triggered by an event.

4. The method of claim 1, wherein the computer is the second register.

5. The method of claim 1, wherein the receiving of the first register mobile subscriber list is initiated by a first operator command.

6. The method of claim 1, further comprising: transmitting the first mobile subscriber list from the first register and to the computer, wherein the transmitting is initiated automatically.

7. The method of claim 1, wherein the tagging of each of the plurality of mobile subscriber identities with the first status includes tagging the first mobile subscriber identity with the first status, wherein the first status indicates that the third register has not been informed of a status of the first mobile subscriber.

8. The method of claim 7, further comprising, after the third register is updated with first mobile subscriber data of the first mobile subscriber, tagging the first mobile subscriber identity with a second status indicating that the third register no longer needs to be informed of the status.

9. The method of claim 8, further comprising fetching mobile subscriber data for mobile subscribers tagged with the second status from the third register in response to a communication paging request.

10. The method of claim 9, further comprising assigning a new temporary mobile subscriber identifier to the mobile subscribers tagged with the second status if a multipoint feature is used.

11. The method of claim 9, wherein the first mobile subscriber list includes mobile subscriber data for mobile subscribers located in a particular location area.

12. The method of claim 11, wherein a communication paging request for mobile subscribers in the particular location area is performed in the particular location area.

13. The method of claim 1, wherein the first register mobile subscriber list comprises international mobile subscriber identifier data.

14. The method of claim 1, wherein the first register mobile subscriber list comprises telephone number data.

15. The method of claim 1, wherein the first register mobile subscriber list comprises age indicator data.

16. The method of claim 1, wherein the first register mobile subscriber list comprises location area code data.

17. The method of claim 1, further comprising prohibiting notification of the first register by the third register that mobile subscribers have moved to a new location area.

18. A non-transitory computer readable medium storing computer executable instructions that, when executed, cause an apparatus to at least:
receive a first register mobile subscriber list;
extract a plurality of mobile subscriber identities from the first register mobile subscriber list, the plurality of mobile subscriber identities including one or more mobile subscriber identities corresponding to one or more mobile subscribers that were being serviced by a fourth register when a first register failed, the fourth register being different than the first register, a second register and a third register;
tag each of the one or more mobile subscriber identities with a first status; and
based on the first status, determine to send a location update message to the third register to update an address of the first register stored in the third register to an address of the second register, allowing a first mobile subscriber corresponding to a first mobile subscriber identity of the plurality of mobile subscriber identities to be serviced by the second register.

19. The non-transitory computer readable medium of claim 18, wherein the tagging of each of the plurality of mobile subscriber identities with the first status includes tagging the first mobile subscriber identity with the first status which indicates that the third register has not been informed of a status of the first mobile subscriber.

20. The non-transitory computer readable medium of claim 19, further storing computer executable instructions that, when executed, cause the apparatus to: after the third register is updated with first mobile subscriber data of the first mobile subscriber, tag the first mobile subscriber identity with a second status indicating that the third register no longer needs to be informed of the status.

21. The non-transitory computer readable medium of claim 18, further storing computer executable instructions that, when executed, cause the apparatus to: prohibit notification of the first register by the third register that mobile subscribers have moved to a new location area.

22. A system comprising:
a first visiting location register configured to create a first mobile subscriber list and transmit the first mobile subscriber list; and
a server configured to determine that the first visiting location register has failed; a second visiting location register configured to:
receive the first mobile subscriber list,
extract a plurality of mobile subscriber identities from the first mobile subscriber list, the plurality of mobile subscriber identities including one or more mobile subscriber identities corresponding to one or more mobile subscribers that were being serviced by a third visiting location register when the first visiting location register failed, the third visiting location register being different than the first visiting location register, the second visiting location register and a home location register,
tag each of the one or more mobile subscriber identities with a first status, and
based on the first status, determine to send a location update message to the home location register to update an address of the first visiting location register stored in the home location register to an address of the second visiting location register, allowing a first mobile subscriber corresponding to a first mobile subscriber identity of the plurality of mobile subscriber identities to be serviced by the second visiting location register.

23. A method comprising:
servicing one or more mobile subscribers, by a first register, subsequent to failure of a second register, wherein servicing of the one or more mobile subscribers is enabled by steps including:
receiving, from a server, a mobile subscriber list of the second register;
extracting a plurality of mobile subscriber identities from the mobile subscriber list, the plurality of mobile subscriber identities including one or more mobile subscriber identities corresponding to one or more mobile subscribers that were being serviced by a third register when the second register failed, the third register being different than the second register and the first register; and
tag each of the one or more mobile subscriber identities with a first status usable to determine to send a location update message to update an address of the second register with an address of the first register.

24. An apparatus comprising:
a processor; and
a memory storing computer executable instructions that, with the processor, cause the apparatus to at least:
receive a first register mobile subscriber list;
extract a plurality of mobile subscriber identities from the first register mobile subscriber list, the plurality of mobile subscriber identities including one or more mobile subscriber identities corresponding to one or more mobile subscribers that were being serviced by a third register when a first register failed, the third register being different than the first register, the apparatus and a second register;
tag each of the one or more mobile subscriber identities with a first status; and
based on the first status, determine to send a location update message to the second register to update an address of the first register stored in the second register to an address of the apparatus, allowing a first mobile subscriber corresponding to a first mobile subscriber identity of the plurality of mobile subscriber identities to be serviced by the apparatus.

25. An apparatus comprising:

a processor; and a memory storing computer executable instructions that, with the processor, cause the apparatus to at least:

communicate a location update message to update an address of a first register with an address of the apparatus, and allow at least one mobile subscriber to be serviced by the apparatus, receive a first register mobile subscriber list;

extract a plurality of mobile subscriber identities from the first register mobile subscriber list, the plurality of mobile subscriber identities including one or more mobile subscriber identities corresponding to one or more mobile subscribers that were being serviced by a second register when the first register failed, the second register being different than the first register and the apparatus; and tag each of the one or more mobile subscriber identities with a first status usable to determine to send the location update message.

\* \* \* \* \*